United States Patent
Rao et al.

(10) Patent No.: US 12,045,321 B2
(45) Date of Patent: Jul. 23, 2024

(54) DIGITAL RIGHTS MANAGEMENT SYSTEMS AND METHODS USING EFFICIENT MESSAGING SCHEMES

(71) Applicant: Intertrust Technologies Corporation, Milipitas, CA (US)

(72) Inventors: Vanishree Rao, San Mateo, CA (US); Robert Tarjan, Princeton, NJ (US); Jarl Nilsson, Mountain View, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

(21) Appl. No.: 18/357,640

(22) Filed: Jul. 24, 2023

(65) Prior Publication Data

US 2023/0367853 A1 Nov. 16, 2023

Related U.S. Application Data

(63) Continuation of application No. 16/421,333, filed on May 23, 2019, now Pat. No. 11,748,455.

(60) Provisional application No. 62/676,404, filed on May 25, 2018.

(51) Int. Cl.
*G06F 21/10* (2013.01)
*G06F 21/12* (2013.01)
*G06F 21/60* (2013.01)

(52) U.S. Cl.
CPC .......... *G06F 21/105* (2013.01); *G06F 21/10* (2013.01); *G06F 21/12* (2013.01); *G06F 21/602* (2013.01)

(58) Field of Classification Search
CPC ...... G06F 21/105; G06F 21/602; G06F 21/12; G06F 21/10; G06F 21/60
See application file for complete search history.

(56) References Cited

U.S. PATENT DOCUMENTS

| 7,891,007 B2 * | 2/2011 | Waxman | H04L 63/0428 726/27 |
| 9,110,902 B1 * | 8/2015 | Dorwin | H04L 9/0631 |
| 2003/0014521 A1 * | 1/2003 | Elson | H04L 9/40 709/225 |
| 2005/0071280 A1 * | 3/2005 | Irwin | H04L 63/065 705/59 |

(Continued)

OTHER PUBLICATIONS

Susan Hohenberger, Guy N. Rothblum, Abhi Shelat, and Vinod Vaikuntanathan. Securely Obfuscating Re-encryption. In Salil P. Vadhan, editor, Theory of Cryptography, 4th Theory of Cryptography Conference, TCC 2007, Amsterdam, The Netherlands, Feb. 21-24, 2007, Proceedings, vol. 4392 of Lecture Notes in Computer Science, pp. 233-252. Springer, 2007. (20 pgs).

(Continued)

*Primary Examiner* — Khalid M Almaghayreh
(74) *Attorney, Agent, or Firm* — John P. Davis; Thayne and Davis LLC (57) ABSTRACT

This disclosure relates to systems and methods for managing protected electronic content that employ relatively efficient messaging schemes. Rights management architectures that provide end-to-end protection of content keys from their point of origination at a content creator and/or content service to end user devices. Certain embodiments further provide for message protocols where fewer messages are sent in connection with a protected content license request process, thereby reducing latency associated with license request and provisioning processes.

15 Claims, 7 Drawing Sheets

(56) References Cited

U.S. PATENT DOCUMENTS

| | | | |
|---|---|---|---|
| 2007/0180519 A1* | 8/2007 | Boccon-Gibod | H04L 9/3242 726/21 |
| 2007/0219917 A1* | 9/2007 | Liu | G06Q 10/10 705/59 |
| 2007/0283423 A1* | 12/2007 | Bradley | G06F 21/1073 726/4 |
| 2008/0103978 A1* | 5/2008 | Houston | H04N 7/173 705/51 |
| 2008/0307494 A1* | 12/2008 | Holtzman | G06F 21/725 726/2 |
| 2008/0307495 A1* | 12/2008 | Holtzman | G06F 21/10 726/2 |
| 2010/0024000 A1* | 1/2010 | Holtzman | H04L 9/3268 726/2 |
| 2015/0026452 A1* | 1/2015 | Roelse | H04L 9/14 713/150 |
| 2019/0044940 A1* | 2/2019 | Khalil | H04L 9/3247 |
| 2019/0258778 A1* | 8/2019 | Park | H04L 9/0894 |

OTHER PUBLICATIONS

PKCS1: Rsa cryptography standard, version 2.0. rsa laboratories, 1998. (43 pgs).

Shashank Agrawal and David J. Wu. Functional encryption: Deterministic to randomized functions from simple assumptions. Jean-Sebastien Coron and Jesper Buus Nielsen, editors, Advances in Cryptology—EUROCRYPT 2017—36th Annual International Conference on the Theory and Applications of Cryptographic Techniques, Paris, France, Apr. 30-May 4, 2017, Proceedings, Part II, vol. 10211 of Lecture Notes in Computer Science, 2017. (45 pgs).

Non-Final Office Action dated May 28, 2021, issued in U.S. Appl. No. 16/421,333 (17 pgs).

Final Office Action dated Jun. 14, 2022, issued in U.S. Appl. No. 16/421,333 (17 pgs).

Non-Final Office Action dated Oct. 27, 2022, issued in U.S. Appl. No. 16/421,333 (16 pgs).

Notice of Allowance dated May 1, 2023, issued in U.S. Appl. No. 16/421,333 (3 pgs).

* cited by examiner

DIGITAL RIGHTS MANAGEMENT SYSTEMS AND METHODS USING EFFICIENT MESSAGING SCHEMES

RELATED APPLICATIONS

This application is a continuation of U.S. patent application Ser. No. 16/421,333, filed May 23, 2019, and entitled "DIGITAL RIGHTS MANAGEMENT SYSTEMS AND METHODS USING EFFICIENT MESSAGING SCHEMES," which claims the benefit of priority under 35 U.S.C. § 119(e) to U.S. Provisional Application No. 62/676,404, filed May 25, 2018, and entitled "SYSTEMS AND METHODS FOR MANAGING DIGITAL RIGHTS USING EFFICIENT MESSAGING SCHEMES," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing electronic content. More specifically, the present disclosure relates to systems and methods for managing rights to protect electronic content that employ relatively efficient messaging architectures.

In certain digital rights management ("DRM") protocols, content keys may be revealed in the clear to a DRM service. This may be undesirable, as it introduces a potential attack surface. Moreover, content creators, content owners, and/or content service providers may be relatively protective of the distribution of their content keys, and therefore may be less willing to provide such keys to other parties and/or services, including DRM services.

Consistent with embodiments disclosed herein, DRM protocols are described that, in some implementations, may provide end-to-end protection of content keys from their point of origination (e.g., a content creator and/or content service provider) to user devices. Certain embodiments may further provide for message protocols where fewer messages are sent in connection with a DRM license request process, thereby reducing latency associated with such processes.

Consistent with certain disclosed embodiment, a method for managing protected content using a DRM system may include receiving a license request message from a content service system. The license request message may include information identifying a piece of protected electronic content and an encrypted content key associated with the piece of protected content. In some embodiments, the content key may be encrypted using a public key of a user device associated with the license request message.

The DRM system may further receive communication session state information associated with the license request message. In some embodiments, the communication session state information may be included in the license request message received from the content service system. In further embodiments, the communication session state information may be received from a user device and/or a separate session state database system. The communication session state information may comprise address and/or port information associated with the user device.

In some embodiments, the received communications session state information may be encrypted. For example, in certain embodiments, the received communication session state information may be encrypted using a decryption key shared with the content service system. The DRM system may use the shared key to decrypt and access the received communication session state information.

The DRM system may generate a content license based, at least in part, on the license request message. In certain embodiments, the content license may be generated in accordance with one or more constraints included in the license request message. In some embodiments, the license may comprise the encrypted content key associated with the piece of protected content. In further embodiments, the license may further comprise at least one license term configured to be enforced in connection using, rendering, and/or otherwise accessing the piece of electronic content.

The generated content license may be communicated to the user device by the DRM service based, at least in part, on the received communication session state information. For example, the generated content license may be transmitted to the address and/or port of the user device identified in the communication session state information. In certain embodiments, the source address associated with the transmitted content license may be spoofed so that the license appears to have a source address associated with the content service.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein in certain instances, but not necessarily all instances, like parts may be designated by like numerals or descriptions. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure but is merely representative of possible embodiments of the disclosure. In addition, the steps of any method and/or process disclosed herein do not necessarily need to be executed in any specific order, or even sequentially, nor need the steps be executed only once, unless otherwise specified.

Various embodiments disclosed herein may use different techniques for managing communication session state. For many-round messaging protocols, state may not necessarily be visible to a DRM service, but rather be hidden in a communication stack. In reduced messaging protocols consistent with various aspects of the disclosed embodiments, session state may be exposed and be used to reduce a number of associated network traversals.

In certain embodiments, connections between various devices, services, and/or associated systems connections may comprise Transmission Control Protocol ("TCP") connections and/or Universal Datagram Protocol ("UDP") connections. In certain TCP connections, three messages may be used to establish the connection and three messages may be used to close the connection, resulting in a total of 8 IP message network traversals for transmitting a single payload message round trip. Accordingly, a total time for a TCP connection where one IP payload packet is exchanged may be approximately three times the time for the exchange of one IP packet. For UDP, the message exchange may take approximately the same amount of time as the exchange of an IP packet.

Various embodiments of the disclosed systems and methods may employ messaging protocols that reduce the total number of exchanged messages in content key provisioning using TCP protocol connections, thereby reducing associated latency. An exchange of TCP messages may, in certain instances herein, be referred to as a "network traversal."

Figure 1:
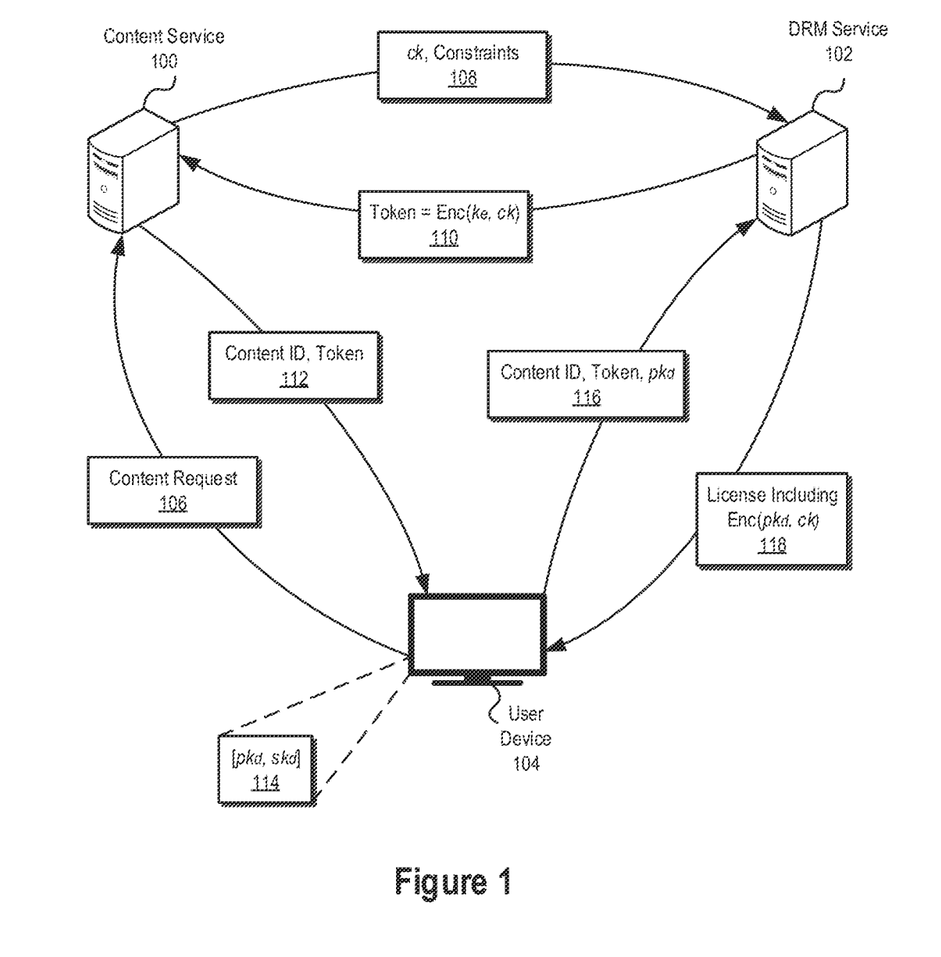
FIG. 1 illustrates an example of an interaction between a content service provider, a DRM service, and a user device consistent with certain embodiments of the present disclosure.

FIG. 1 illustrates an example of an interaction between a content service 100, a DRM service 102, and a user device 104 consistent with certain embodiments of the present disclosure. In certain embodiments, a DRM license request and/or provisioning process may involve interactions between the content service 100, the DRM service 102, and/or the user device 104. Although embodiments disclosed herein are discussed in connection with interactions between a content service 100, a DRM service 102, and/or a user device 104, it will be appreciated that embodiments of the disclosed systems and processes may be implemented using a variety of other devices, systems, and/or services and/or involve interactions between other devices, systems, and/or services, including intermediate devices, systems, and/or services. In addition, although illustrated as single systems and/or services, it will be appreciated that, in certain embodiments, the DRM service 102 and/or the content service 100 may be implemented using a plurality of systems operating to deliver services.

The content service 100, DRM service 102, user device 104 and/or one or more other systems and/or services (not shown) may comprise any suitable computing system or combination of systems configured to implement embodiments of the systems and methods disclosed herein. In certain embodiments, the content service 100, DRM service 102, user device 104 and/or one or more other systems and/or services may comprise at least one processor system configured to execute instructions stored on an associated non-transitory computer-readable storage medium. As discussed in more detail below, the content service 100, DRM service 102, user device 104 and/or one or more other systems and/or services and/or other service providers may further comprise a secure processing unit ("SPU") configured to perform sensitive operations such as trusted credential, license, and/or key management, secure policy management, and/or other aspects of the systems and methods disclosed herein. The content service 100, DRM service 102, user device 104 and/or one or more other systems and/or services may further comprise software and/or hardware configured to enable electronic communication of information between the devices and/or services via one or more associated network connections.

The content service 100, DRM service 102, user device 104 and/or one or more other systems and/or services may comprise a computing device executing one or more applications configured to implement embodiments of the systems and methods disclosed herein. In certain embodiments, the user device 104 may comprise at least one of a smartphone, a smartwatch, a laptop computer system, a desktop computer system, a display, a gaming system, an entertainment system, a streaming media system, a wearable health monitoring device, a tablet computer, a smart home device, a digital assistant device, a connected appliance, and/or any other computing system and/or device that may be used in connection with the disclosed systems and methods. In certain embodiments, the user device 104 may comprise software and/or hardware configured to request and receive content and/or content licenses from a content service 100, DRM service 102, and/or another system or service, and/or to use received content licenses to decrypt and/or otherwise enable access to, rendering of, and/or use of protected content. The content service 100 may comprise a service and/or system associated with a content creator and/or generator, a content distributor, and/or any other content-related system and/or service.

The content service 100, DRM service 102, user device 104 and/or one or more other systems and/or services may communicate using a network comprising any suitable number of networks and/or network connections. The network connections may comprise a variety of network communication devices and/or channels and may use any suitable communication protocols and/or standards facilitating communication between the connected devices and systems. For example, in some embodiments, the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee and or any other suitable communication protocol(s).

A license and/or content key request and/or provisioning process consistent with aspects of the disclosed embodiments may result in a DRM license and/or a content key, ck, being communicated to an authorized device that has requested and/or otherwise wishes to access, use, and/or render content. In certain embodiments, the content key may be included in the DRM license and communicated with the license and/or may be communicated separately from the DRM license.

As illustrated, the user device 104 may provide the content service 100 with a content request message 106. The content request message 106 may comprise information identifying protected content that the user device 104 would like to access, use, and/or otherwise render, information relating to a type requested content access, and/or the like. In some embodiments, the content request message 106 may be associated with content that the user device 104 has downloaded and/or otherwise stored and would like to access, use, and/or render. In further embodiments, the content request message 106 may be associated with content that the user device 104 would like to download and/or otherwise store for later use. In yet further embodiments, the content request message 106 may be associated with content that the user would like to stream from a service (e.g., the content service 100 and/or another associated service provider).

The content service 100 may provide a DRM service 102 with a content key, ck, associated with the content identified in the content request message 106 and/or associated constraints 108. In some embodiments, the content key and/or associated constraints 108 may be protected during transmission between the content service 100 and/or the DRM service 102 (e.g., using suitable cryptographic encryption and/or other secure communication techniques). In certain embodiments, the constraints may articulate one or more requirements and/or parameters that the DRM service 102 may use in connection with license generation processes.

The DRM service 102 may generate a token 110 based, at least in part, on the content key and the constraints 106 received from the content service 100. In some embodiments, the token 110 may comprise the content key provided by the content service 100, ck, encrypted with a symmetric key of the DRM service, $k_e$. The token 110 may be communicated from the DRM service 102 to the content service 100.

In response to the content request message 106, the content service 100 may return to the user device 104 a message 112 that includes the token provided by the DRM service 102 and/or information that identifies (e.g., uniquely identifies) the associated content.

The user device 104 may be associated with a public key secret-key pair, 114 $pk_d$, $sk_d$. To obtain a license and/or associated content keys, ck, from the DRM service 102, the user device 104 may communicate a license request message 116 to the DRM service 102. The license request message 116 may comprise the information identifying the associated content, the token included in the message 112 received from the content service 100, and/or the public key, $pk_d$, of the user device 104.

The DRM service 102 may determine whether the user device 104 is authorized to access, use, and/or otherwise render the protected content associated with the license request message 116. If the user device 104 is authorized, the DRM service 102 may issue a license 118 to the user device 104. In certain embodiments, the license 118 may comprise an encrypted copy of the content key, ck. For example, the license 118 may comprise the content key, ck, encrypted with the public key, $pk_d$, of the user device 104. The license 118 may further comprise various license terms and/or other associated license information that may be enforced by the user device 104 in connection with the accessing, use, and/or rendering of the protected content. In certain embodiments, the encrypted content key may be communicated separately from other license information included in the license 118.

In the interaction illustrated in FIG. 1, the DRM service 102 may have access to content keys in the process of relating the content keys from the content service 100 to the user device 104. Accordingly, the content keys in the illustrated interaction may not necessarily be end-to-end protected. In addition, the number of messages exchanged from the time a user device 104 issues a playback request (e.g., by transmitting a content request 106 to the content service 100) to the time when the license 118 and/or content key is received by the user device 104 may introduce higher latency.

Efficient Messaging Architectures Using Session State Information

Certain embodiments of the disclosed systems and methods may use a relatively efficient messaging protocol that employs the use of an indication of a DRM session state. The DRM session state may be maintained in a table and/or included in exchanged messages. In certain instances herein, the indication of the DRM service session state may be referred to as a "cookie."

Figure 2:
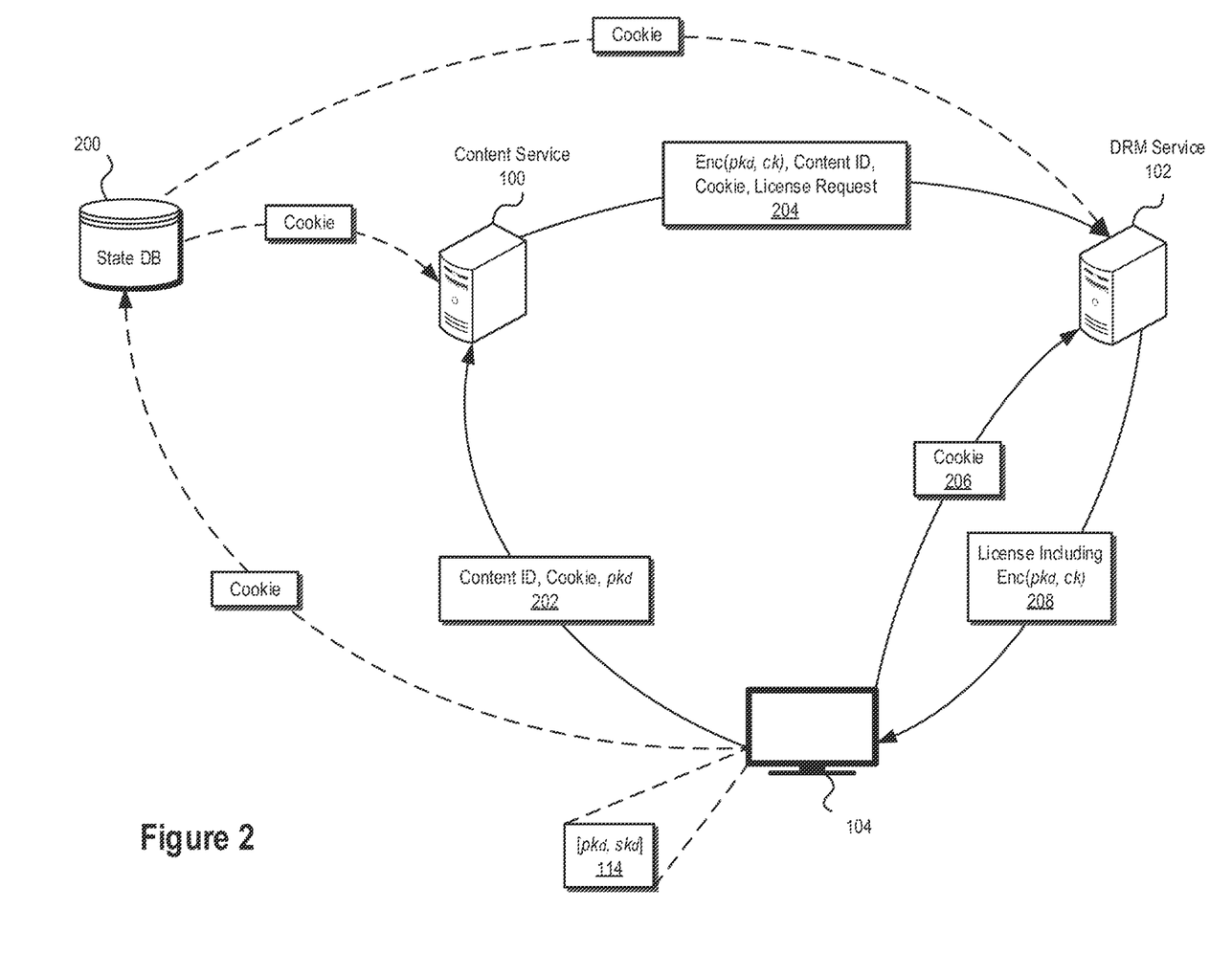
FIG. 2 illustrates an example of an interaction between a content service provider, a DRM service, and a user device using an efficient messaging protocol consistent with certain embodiments of the present disclosure.

FIG. 2 illustrates an example of an interaction between a content service provider 100, a DRM service 102, and a user device 104 using an efficient messaging protocol consistent with certain embodiments of the present disclosure. In some embodiments, the illustrated interaction may use an indication of a DRM session state that may be embodied as a cookie. Use of the cookie in the illustrated interaction may, among other things, allow for connections to be established with reduced network traffic and/or associated latency As illustrated, the user device 104 may communicate a content request message 202 to the content service 100. The content request message 202 may comprise information identifying protected content that the user device 104 would like to access, use, and/or otherwise render, information relating to a type requested content access, and/or the like. For example, the content request message 202 may comprise information identifying protected content that the user device 104 has downloaded and/or intends to download and/or stream and render on the user device 104.

The content request message 202 may further comprise a cookie that may, in some embodiments, include DRM session state information. In various embodiments, the cookie may comprise communication and/or session context information that may allow a system, service, and/or device possessing the cookie to establish a communication session with the user device 104. In certain embodiments, the cookie may comprise a unique session cookie that includes communication session that may be used to identify and/or otherwise open a communication channel with the user device 104. The content request message 202 may also include the public key, $pk_d$, of the user device 104.

The cookie may be further communicated via message 206 from the user device 104 to the DRM service 102. In certain embodiments, transmission of the content request message 202 to the content service 100 and the cookie message 206 to the DRM service 102 may occur in parallel and/or in a relatively contemporaneous timeframe. In various embodiments, the DRM service 102 may use the cookie included in the content request message 202 with the cookie included in the cookie message 206 to match the content request message 202 with information included in the cookie message 206 received from the user device 104.

The content service 100 may verify that the user device 104 is authorized to access, use, and/or otherwise render the content identified in the content request message 202. The content service 100 may then send a license request message 204 to the DRM service 102. The license request message 204 may comprise the content key, ck, encrypted with the public key, $pk_d$, of the user device 104, information identifying the associated content, the unique session cookie associated with the user device 104, and/or any other license request parameters (e.g., license terms and/or other associated license information).

Based on the license request message 204, the DRM service 102 may generate a license 208 and communicate the license 208 to the user device 104 based on the communication session state information included in the cookie. As illustrated, the license 208 may include the content key, ck, encrypted with the public key, $pk_d$, of the user device 104. The license 208 may further comprise various license terms and/or other associated license information that may be enforced by the user device 104 in connection with the accessing, use, and/or rendering of the protected content. In certain embodiments, the encrypted content key may be communicated separately from other license information included in the license 208.

The user device 104 may decrypt the content key received in the license 208 using its corresponding secret key, $sk_d$, and may allow access, use, and/or rendering of the content in accordance with any applicable terms included in the license 208.

As discussed above, in certain embodiments, the unique session cookie associated with the user device 104 may be included in one or more messages 202, 206, 204 communicated between the user device 104, the content service 100, and the DRM service 102. In further embodiments, the cookie may be stored by the user device 104 in a session state database 200 that may be accessible to the content service 100 and/or the DRM service 102. In some embodiments, the session state database 200 may be managed and/or otherwise be associated with a different system and/or service than the content service 100, the DRM service 102, and/or the user device 104. In other embodiments, the session state database 200 may be managed and/or otherwise be associated with one or more of the user device 104, the content service 100, and/or the DRM service 102.

In certain embodiments, session state may be maintained in the illustrated architecture for a relatively short amount of time (e.g., on the order of a second), which may allow for relatively small and efficient databases to manage state. In some embodiments, asynchronous message management techniques may be employed as it may be difficult to determine what order messages will arrive at the DRM service 102. In certain embodiments, the session state database 200 and/or session state databases local to the user device 104, the content service 100, and/or the DRM service 102 may be combed for timed out messages. In some implementations, a session time to effectuate a DRM license request and/or provisioning process in the illustrated architecture may be similar to a single network round trip (e.g., two network traversals).

Figure 3:
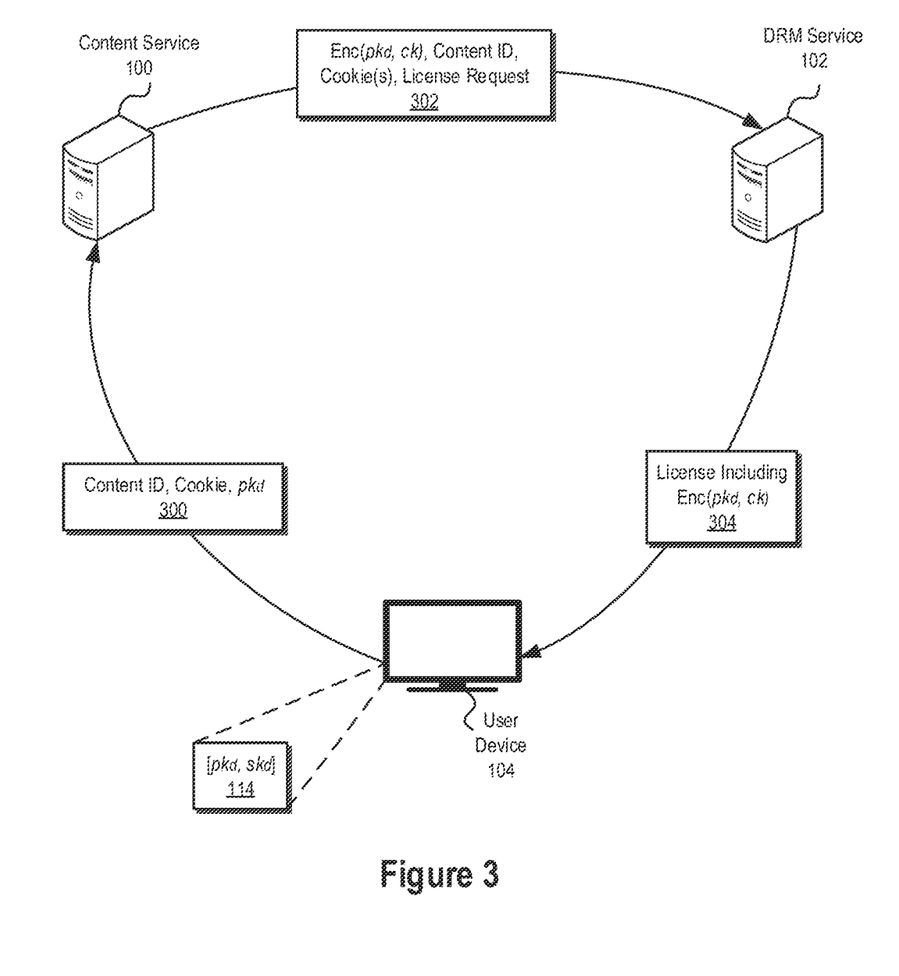
FIG. 3 illustrates an example of an interaction between a content service provider, a DRM service, and a user device using another efficient messaging protocol consistent with certain embodiments of the present disclosure.

FIG. 3 illustrates an example of an interaction between a content service 100, a DRM service 102, and a user device 104 using another efficient messaging protocol consistent with certain embodiments of the present disclosure. In certain embodiments, UDP punch through techniques may be used to reduce the need for the user device 104 to directly share the unique session cookie with the content service 100 and/or the DRM service 102. This may, among other things, relax requirements for managing global state by the DRM service 102 as session state may travel as part of exchanged messages 300, 302.

As illustrated, the user device 104 may communicate a content request message 300 to the content service 100. The content request message 300 may comprise information identifying protected content that the user device 104 would like to access, use, and/or otherwise render, information relating to a type requested content access, and/or the like. For example, the content request message 300 may comprise information identifying protected content that the user device 104 has downloaded and/or intends to download and/or stream and subsequently render on the user device 104.

The content request message 300 may further comprise a cookie that, in some embodiments, may include DRM session state information. In various embodiments, the cookie may comprise communication and/or session context information that may allow a system, service, and/or device possessing the cookie to establish a communication session with the user device 104. In certain embodiments, the cookie may comprise a unique session cookie that includes communication session that may be used to identify and/or otherwise open a communication channel with the user device 104. The content request message 300 may also include the public key, $pk_d$, of the user device 104

The content service 100 may verify that the user device 104 is authorized to access, use, and/or otherwise render the content identified in the content request message 300. The content service 100 may then send a license request message 302 to the DRM service 102.

As discussed above, in certain embodiments, the content request message 300 may comprise the cookie. In further embodiments, the content request message 300 may not necessarily include the cookie, but include information that may be used by the content service 100 to generate the cookie. For example, the content service 100 may capture the source address from an IP header of the content request message 300 received from the user device 104 and an associated port information (e.g., a port number) from the UDP header of the content request message 300. The content service 100 may generate a cookie that includes the captured source address and/or port information. In some embodiments, the cookie generated by the content service 100 may be encrypted using a shared key with the DRM service 102 prior to transmission as part of a license request message 302, as the information included in the cookie may be used to determine a route to the user device 104 that is waiting for a response to the content request message 300.

The license request message 302 may comprise the content key, ck, encrypted with the public key, $pk_d$, of the user device 104, information identifying the associated content, the unique session cookie generated by the user device 104, and/or the cookie generated by the content service 100 including captured source address and/or port information associated with the user device 104, which may be encrypted, and/or any other license request parameters (e.g., license terms and/or other associated license information).

Based on the license request message 302, the DRM service 102 may generate a license 304 and communicate the license 304 to the user device 104 based on the communication session state information included in the cookie generated by the user device 104 and/or by the content service 100. In certain embodiments, the cookie generated by the content service 100 may be decrypted by the DRM service 102 to access the associated captured address and/or port information of the user device 104. In some embodiments, the source address of the license 304 communicated from the DRM service 102 to the user device 104 may be spoofed to be the address of the content service 100.

As illustrated, the license 304 may include the content key, ck, encrypted with the public key, $pk_d$, of the user device 104. The license 304 may further comprise various license terms and/or other associated license information that may be enforced by the user device 104 in connection with the accessing, use, and/or rendering of the protected content. In certain embodiments, the encrypted content key may be communicated separately from other license information included in the license 304.

The user device 104 may decrypt the content key received in the license 304 using its corresponding secret key, $sk_d$, and may allow access, use, and/or rendering of the content in accordance with any applicable terms included in the license 304.

The interactions illustrated in FIG. 3 may be potentially faster than the interactions illustrated in FIG. 2. The illustrated architecture may also reduce added overhead of establishing TCP connections and/or the need to maintain a global state database. Assuming that the compute time in the nodes is negligible, the average wait time for a user of the device may be three times a UDP message network traversal. A TCP connection may involve at least three IP packets to establish a socket connection, while UDP may involve a single IP packet network traversal. In effect, the total time of the illustrated interactions may be one third of the time for a similar TCP protocol.

4-Round Architectures

Certain messaging interactions, such as the examples illustrated in FIG. 4 and FIG. 5 and described in more detail below, may not necessarily use a session state cookie as described above, and thus in some implementations may be stateless at the DRM service communication level. In certain embodiments, these 4-round interactions may involve at least four network traversals and thus the average wait time for a user of the client device may be approximately four times the average network latency.

In certain 4-round messaging interactions, the content key may be encrypted under the device's public key and may reach the device before it requests for the license, whereas in other disclosed interactions the content key may not necessarily reach the device before the license request. In various other interactions, ciphertext containing the content key may be encrypted with a symmetric key common to the content service and the DRM service. Architectures where the content key may be encrypted under the user's device's public key and may reach the device before it requests for the license may be referred to in certain instances herein as 4-round single-encryption architectures, whereas architectures where ciphertext containing the content key may be encrypted with a symmetric key common to the content service and the DRM service may be referred to in Certance instances herein as 4-round double-encryption architectures.

4-Round Single-Encryption Architectures

Figure 4:
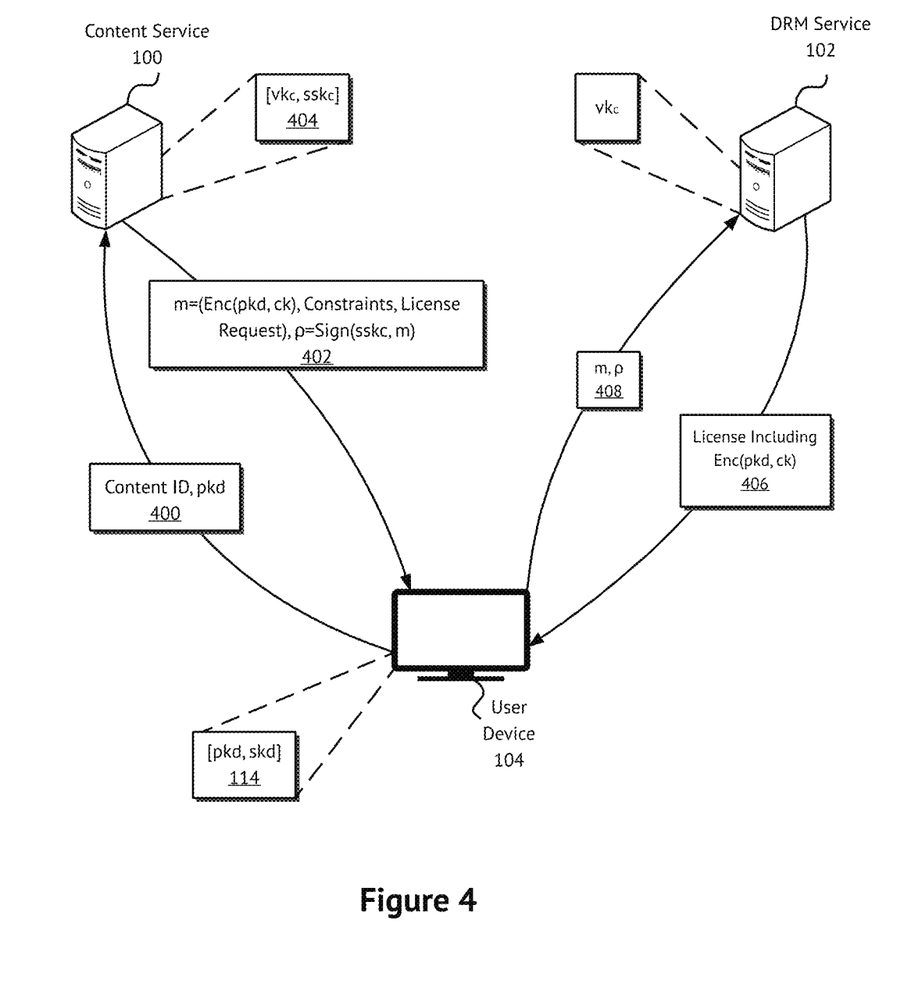
FIG. 4 illustrates an example of an interaction between a content service provider, a DRM service, and a user device using a further efficient messaging protocol consistent with certain embodiments of the present disclosure.

FIG. 4 illustrates an example of an interaction between a content service 100, a DRM service 102, and a user device 104 using a further efficient messaging protocol consistent with certain embodiments of the present disclosure. As illustrated, the user device 104 may provide the content service 100 with a content request message 400. The content request message 400 may comprise information identifying protected content that the user device 104 would like to access, use, and/or otherwise render, information relating to a type requested content access, and/or the like. In some embodiments, the content request message 400 may be associated with content that the user device 104 has downloaded and/or otherwise stored and would like to access, use, and/or render. In further embodiments, the content request message 400 may be associated with content that the user device 104 would like to download and/or otherwise store for later use. In yet further embodiments, the content request message 400 may be associated with content that the user would like to stream from a service (e.g., the content service 100 and/or another associated service provider). The content request message 400 may also include the public key, $pk_d$, of the user device 104.

The content service 100 may possess one or more keys 404. For example, the content service 100 may possess at least a shared verification key, $vk_c$, and a signing key, $ssk_c$. Based on the received content request message 400, the content service 100 may verify that the user device 104 is authorized to access, use, and/or otherwise render the content identified in the content request message 400.

If the user device is authorized, the content service 100 may generate a content request response message 402. The content request response message 402 may include, for example, one or more of an encrypted content key associated with the content identified in the content request message 402. The content key may be encrypted by the content service 100 using the public key, $pk_d$, of the user device 104. The content request response message 402 may further include a license request that may comprise one or more constraints and/or parameters such as, for example, validity parameters, to be encoded in a license associated with the content. The encrypted content key, license request, and/or any associated constraints and/or parameters may be collectively denoted in certain instances herein as m.

The content service 100 may sign m using a key. For example, the content service may sign m using its signing key, $ssk_c$. The resulting signature may be denoted in certain instances herein as ρ. m and ρ may be communicated to the user device 104 from the content service 100 as part of the content request response message 402.

The user device 104 may communicate m and ρ to the DRM service 102 as part of a licenses request message 408. The DRM service 102 may verify the signature of ρ using the shared verification key, $vk_c$. If the signature is verified, the DRM service 102 may generate a license 406. If the signature is not verified, the license request message 404 may be ignored by the DRM service 102.

The license 406 may comprise the content key, ck, encrypted with the public key, $pk_d$, of the user device 104. The license 406 may further comprise various license terms and/or other associated license information that may be enforced by the user device 104 in connection with the accessing, use, and/or rendering of the protected content. In certain embodiments, the encrypted content key may be communicated separately from other license information included in the license 406.

In some embodiments, the DRM service 102 may parse the ciphertext Enc(pk$_d$, ck) included in the licenses request message 408. The DRM service 102 may generate the license 406 by embedding the ciphertext in the associated message.

4-Round Double-Encryption Architectures

Figure 5:
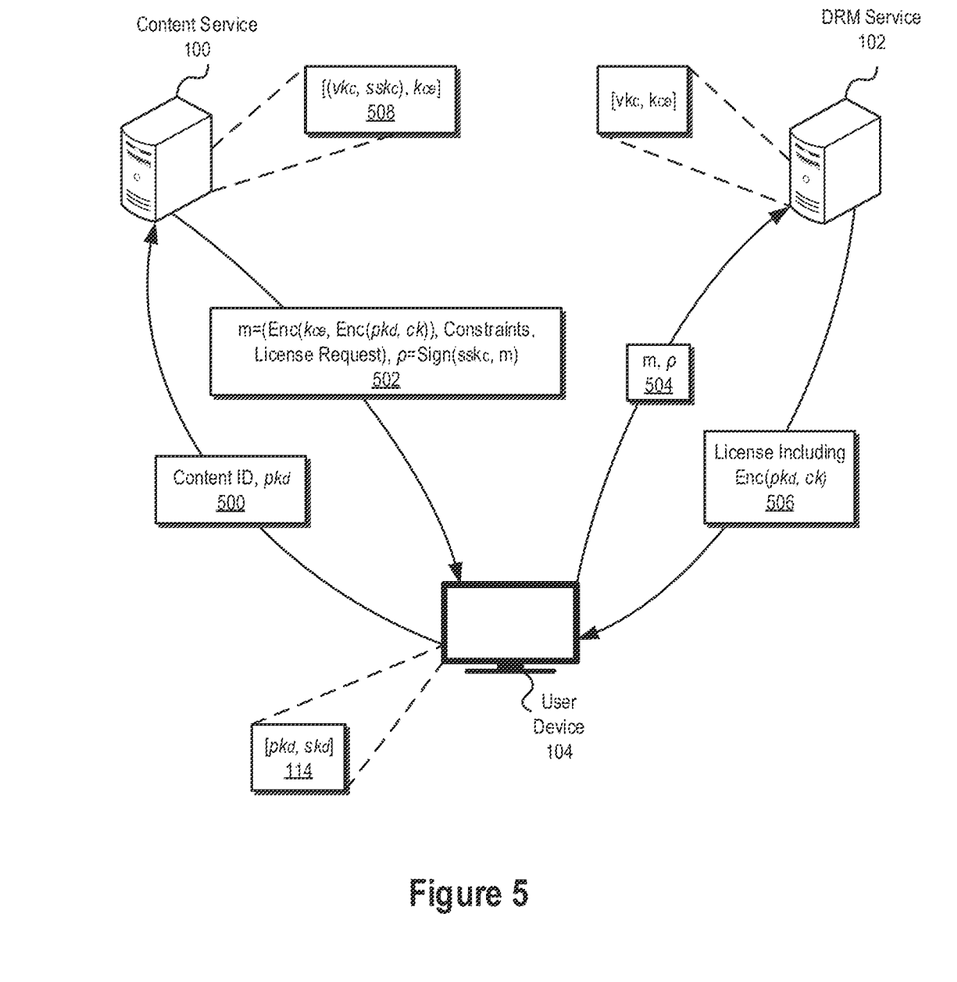
FIG. 5 illustrates an example of an interaction between a content service provider, a DRM service, and a user device using an additional efficient messaging protocol consistent with certain embodiments of the present disclosure.

FIG. 5 illustrates an example of an interaction between a content service 100, a DRM service 102, and a user device 104 using an additional efficient messaging protocol consistent with certain embodiments of the present disclosure. As illustrated, the user device 104 may provide the content service 100 with a content request message 500. The content request message 500 may comprise information identifying protected content that the user device 104 would like to access, use, and/or otherwise render, information relating to a type requested content access, and/or the like. In some embodiments, the content request message 500 may be associated with content that the user device 104 has downloaded and/or otherwise stored and would like to access, use, and/or render. In further embodiments, the content request message 500 may be associated with content that the user device 104 would like to download and/or otherwise store for later use. In yet further embodiments, the content request message 500 may be associated with content that the user would like to stream from a service (e.g., the content service 100 and/or another associated service provider). The content request message 500 may also include the public key, pk$_d$, of the user device 104.

The content service 100 may possess one or more keys 508. For example, the content service 100 may possess at least a shared verification key, vk$_c$, a signing key, ssk$_c$, and/or a symmetric key common to the content service 100 and the DRM service 102, k$_{ce}$.

Based on the received content request message 500, the content service 100 may verify that the user device 104 is authorized to access, use, and/or otherwise render the content identified in the content request message 500. If the user device is authorized, the content service 100 may generate a content request response message 502. The content request response message 502 may include, for example, one or more of an encrypted content key associated with the content identified in the content request message 500. The content key may be encrypted by the content service 100 using the public key, pk$_d$, of the user device 104. The encrypted content key may be further encrypted using the symmetric key common to the content service 100 and the DRM service 102, k$_{ce}$ (i.e., Enc(k$_{ce}$, Enc(pk$_d$, ck))).

The content request response message 502 may further include a license request that may comprise one or more constraints and/or parameters such as, for example, validity parameters, to be encoded in a license associated with the content. The encrypted content key, which may be further encrypted using k$_{ce}$, the license request, and/or any associated constraints and/or parameters may be collectively denoted in certain instances herein as m.

The content service 100 may sign m using a key. For example, the content service may sign m using its signing key, ssk$_c$. The resulting signature may be denoted in certain instances herein as ρ. m and ρ may be communicated to the user device 104 from the content service 100 as part of the content request response message 502.

The user device 104 may communicate m and ρ to the DRM service 102 as part of a license request message 504. In some embodiments, the DRM service 102 may verify the signature of ρ using the shared verification key, vk$_c$. If the signature is verified, the DRM service 102 may generate a license 506. If the signature is not verified, the license request message 504 may be ignored by the DRM service 102.

The license 506 may comprise the content key, ck, encrypted with the public key, pk$_d$, of the user device 104. The license 506 may further comprise various license terms and/or other associated license information that may be enforced by the user device 104 in connection with the accessing, use, and/or rendering of the protected content. In certain embodiments, the encrypted content key may be communicated separately from other license information included in the license 406.

In some embodiments, the DRM service 102 may parse the ciphertext Enc(k$_{ce}$, ck) included in the license request message 404. The DRM service 102 may generate the license 506 by embedding the ciphertext in the associated message. For example, the DRM service may decrypt the encrypted content key using the symmetric key common to the content service 100 and the DRM service 102, k$_{ce}$, and include the resulting content key encrypted using the public key, pk$_d$, of the user device 104 in the license 506.

Load Balancing and Redundancy

In certain embodiments, the robustness of the system may be improved against failure by deploying several instances of a type of node. Load balancing may refer to the practice of spreading incoming messages to one of a pool of servers in order to serve peak demand with similar speed as normal demand. The server pool can increase or decrease as demand varies. Redundancy may refer to the practice of having services that may take over if some other server fails. In some implementations, the location of the servers may be distributed.

In some embodiments, a DRM service and/or a content service may comprise a plurality of servers acting to deliver a service. For certain architectures (e.g., the architecture illustrated in FIG. 2), a session state cookie may be shared with internal DRM service nodes through any suitable protocol (e.g., a whisper protocol) and/or the cookie may be made available in a global database. This may increase the time for operations involving the DRM service. For other disclosed embodiments (e.g., the architectures illustrated in FIGS. 3-5), the choice of a load balancer may determine how the node responds. In some distributed server services, the load balancer may patch the incoming packets to hand over the session to a specific instance.

Content Streaming and Initial Playback

In certain situations, such as, for example content streaming, issues relating to the speed of a license request and provisioning process may be reduced by initiating a streaming, downloading, rendering process upon initial request, providing an initial first portion of the content in the clear, initiating a license request process, and later using a received license to render a remaining encrypted portion of the content. This may provide sufficient time for a content and/or DRM service to respond to a licensing provisioning request without interrupting content playback.

Figure 6:
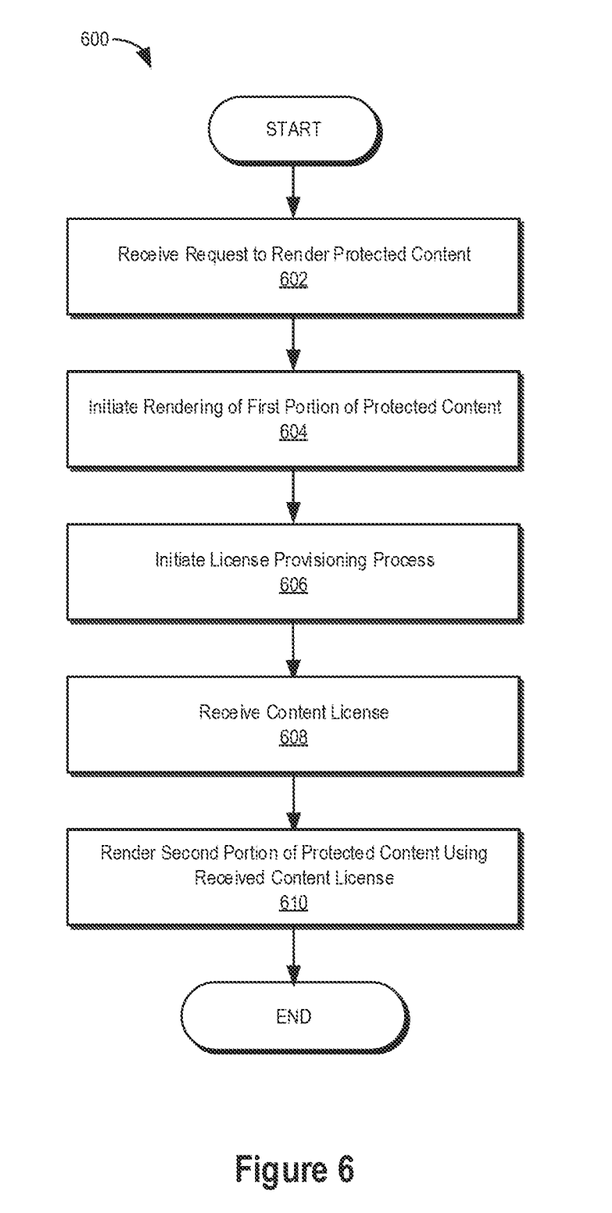
FIG. 6 illustrates a flow chart of an example of a method for rendering protected content consistent with certain embodiments of the present disclosure.

FIG. 6 illustrates a flow chart of an example of a method 600 for rendering protected content consistent with certain embodiments of the present disclosure. The illustrated method 600 may be implemented in a variety of ways, including using software, firmware, hardware, and/or any combination thereof. In certain embodiments, various aspects of the method 600 and/or its constituent steps may be performed by a user device, a content service, a DRM service, and/or any other suitable system and/or services or combination of systems and/or services.

At 602, a request to access, use, and/or otherwise render protected content may be received. For example, a user device may receive a request from a user to access, use, and/or otherwise render protected content. The protected content may be delivered to the user device via a stream, download, and/or any other suitable content delivery technique. Consistent with various aspects of the disclosed embodiments, the protected content may comprise a first initial portion that is not encrypted and/or otherwise protected and a second portion following the initial portion that is encrypted and/or otherwise protected.

At 604, the first initial portion of the content may be accessed, used, and/or otherwise rendered in response to the request received at 602. The user device may initiate a licensing request and/or provisioning process at 606 to receive a license to access, use, and/or otherwise render the protected content. The license request and/or provisioning process may involve any of the licensing request and/or provisioning processes and/or messaging architectures disclosed herein and/or any aspects thereof, although it will be appreciated that other licensing requests and/or provisioning processes and/or associated messaging architectures may also be used in connection with the illustrated method 600.

At 608, a content license may be received that may be used to access, use, and/or otherwise render the second portion of the protected content. In some embodiments, the content license may comprise one or more content keys (which may be protected and/or otherwise encrypted) and/or applicable license terms. The content key may be retrieved from the received licenses, decrypted if applicable, and be used to decrypt the second portion of the protected content, thereby allowing the second portion of the protected content to be accessed, used, and/or otherwise rendered in accordance with applicable license terms at 610. In this manner, access, use, and/or playback of the protected content may be initialized for at least a portion of the content while the license request and/or provision process proceeds, thereby reducing any delays in the initialization of the access, use, and/or playback of the protected content.

Figure 7:
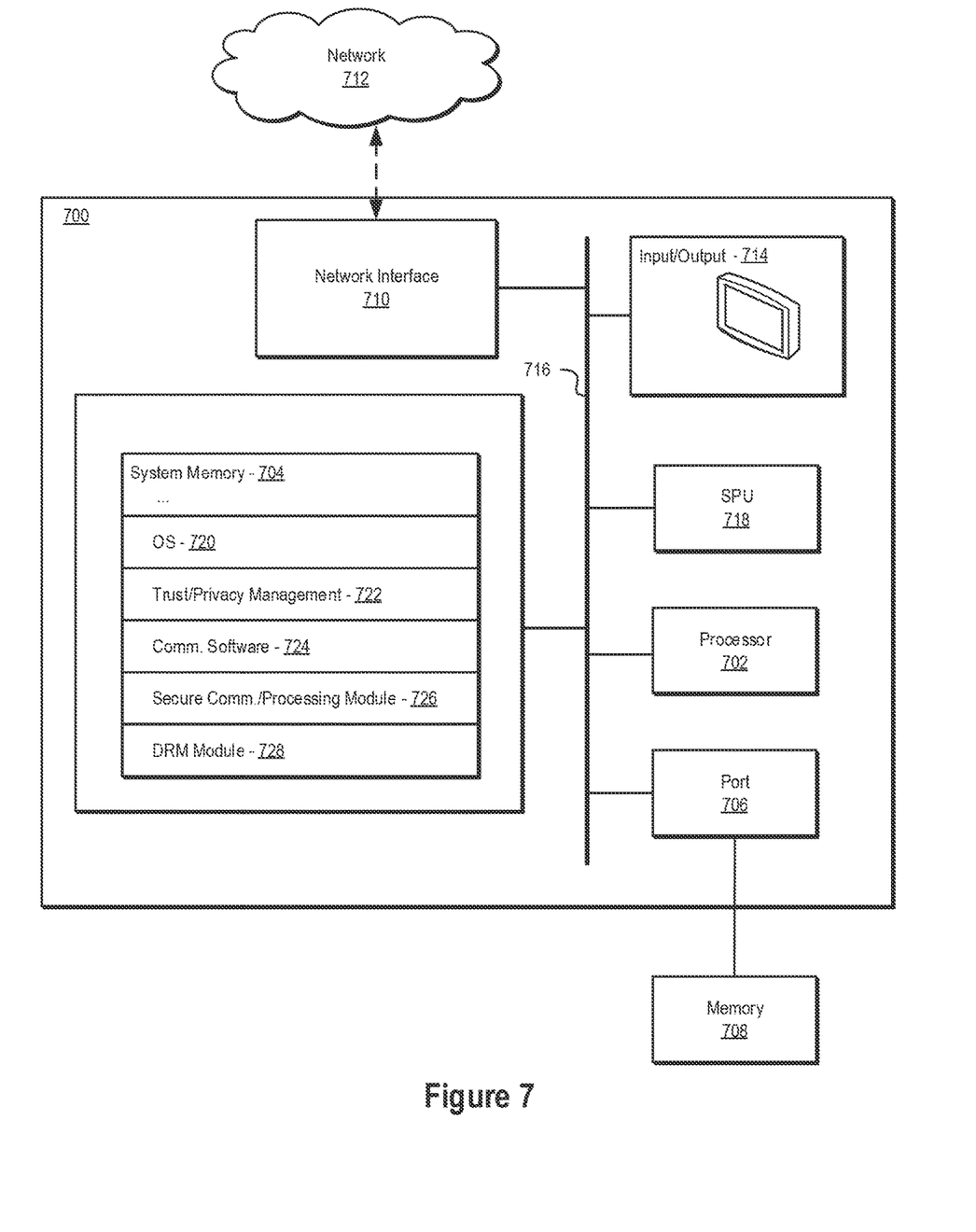
FIG. 7 illustrates an example of a system that may be used to implement embodiments of the systems and methods of the present disclosure.

FIG. 7 illustrates an exemplary system 700 that may be used to implement embodiments of the systems and methods of the present disclosure. Certain elements associated with the illustrated exemplary system may be included in a user device, a content service, a DRM service, and/or any other system and/or service configured to implement embodiments of the disclosed systems and methods.

As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 706 for interfacing with removable memory 708 that may include one or more diskettes, optical storage mediums, and/or other non-transitory computer-readable storage mediums (e.g., flash memory, thumb drives, USB dongles, compact discs, DVDs, etc.); a network interface 710 for communicating with other systems via one or more network connections 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system.

In some embodiments, the system 700 may, alternatively or in addition, include an SPU 718 that is protected from tampering by a user of the system or other entities by utilizing secure physical and/or virtual security techniques. An SPU 718 can help enhance the security of sensitive operations such as personal information management, trusted credential and/or key management, license, privacy, and policy management, and other aspects of the systems and methods disclosed herein. In certain embodiments, the SPU 718 may operate in a logically secure processing domain and be configured to protect and operate on secret information, including cryptographic keys, as described herein. In some embodiments, the SPU 718 may include internal memory storing executable instructions or programs configured to enable the SPU 718 to perform secure operations.

The operation of the system 700 may be generally controlled by a processing unit 702 and/or an SPU 718 operating by executing software instructions and programs stored in the system memory 704 (and/or other computer-readable media, such as removable memory 708). The system memory 704 may store a variety of executable programs or modules for controlling the operation of the system. For example, the system memory may include an operating system ("OS") 720 that may manage and coordinate, at least in part, system hardware resources and provide for common services for execution of various applications and a trust and privacy management system 722 for implementing trust and privacy management functionality including protection and/or management of secure data and/or keys through management and/or enforcement of associated policies. The system memory 704 may further include, without limitation, communication software 724 configured to enable in part communication with and by the system 700; one or more applications; a secure communication and/or processing module 726 configured to perform various aspects of the disclosed embodiments (e.g., message generation, cryptographic operations, etc.), a DRM module 728 configured to perform various aspects of the disclosed embodiments (e.g., license request and/or response generation and/or processing), and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for accessing protected content performed by a device comprising a processor and a non-transitory computer-readable medium storing instructions that, when executed by the processor, cause the device to perform the method, the method comprising:
    generating a content request message, the content request message comprising information identifying protected electronic content and a public key of the device;
    issuing, from the device to a content service system, the content request message, the content service system being a different system than the device;
    receiving, by the device from the content service system, a content request response message, the content request response message comprising a protected content decryption key and license request information, the protected content decryption key comprising a content decryption key associated with the protected electronic content encrypted with the public key of the device;
    generating a license request message, the license request message comprising the protected content decryption key and the license request information;
    issuing, from the device to a rights management system, the license request message, the rights management system being a different system than the content service system and the device;
    receiving, by the device from the rights management system, a content license generated by the rights management system, the content license comprising the protected content decryption key, wherein an unencrypted version of the content decryption key is not exposed to the rights management system during generation of the content license; and
    accessing, by the device, at least a portion of the protected electronic content using the content license, wherein accessing the at least the portion of the protected electronic content using the content license comprises:
    decrypting the protected content decryption key using a private key of the device corresponding to the public key to generate the content decryption key, and
    decrypting the at least the portion of the protected electronic content using the content decryption key.

2. The method of claim 1, wherein the content request message further comprises a type of access to the protected electronic content requested by the device.

3. The method of claim 1, wherein the protected electronic content is stored by the device.

4. The method of claim 1, wherein the protected electronic content is downloadable by the device, and wherein accessing the protected electronic content using the content license further comprises initiating a download of the protected electronic content.

5. The method of claim 1, wherein the protected electronic content is streamable by the device, and wherein accessing the protected electronic content using the content license further comprises initiating a stream of the protected electronic content.

6. The method of claim 1, wherein the license request information further comprises one or more license constraints specified by the content service.

7. The method of claim 1, wherein the content license is generated in accordance with the one or more license constraints.

8. The method of claim 1, wherein the content license comprises at least one license term configured to be enforced in conjunction with accessing the piece of electronic content.

9. The method of claim 1, wherein the method further comprises receiving, by the device from the content service system, an electronic signature of the content request response message.

10. The method of claim 9, wherein the electronic signature comprises a cryptographic signature of the content request response message generated using a signing key associated with the content service system.

11. The method of claim 10, wherein the license request message further comprises the electronic signature.

12. The method of claim 11, wherein the content license is generated by the rights management system in response to a successful verification of the electronic signature.

13. The method of claim 12, wherein the content license is generated by the rights management system in response to successful verification of the electronic signature using a verification key shared with the content service system.

14. The method of claim 1, wherein the protected electronic content comprises at least a first portion and a second portion, the second portion of the protected electronic content corresponding to the at least the portion of the protected electronic content accessed using the content license, and wherein the method further comprises accessing the first portion of the protected electronic content prior to receiving the content license from the rights management system.

15. The method of claim 14, wherein accessing the first portion of the protected electronic content comprises initiating a stream of the first portion of the protected electronic content.

* * * * *